(12) United States Patent
Guillard

(10) Patent No.: US 6,393,867 B1
(45) Date of Patent: May 28, 2002

(54) INSTALLATION PRODUCING LOW VOLTAGE ELECTRICITY INTEGRATED IN A UNIT SEPARATING GAS FROM AIR

(75) Inventor: Alain Guillard, Paris (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/762,271

(22) PCT Filed: Aug. 4, 1999

(86) PCT No.: PCT/FR99/01931

§ 371 (c)(1),
(2), (4) Date: Feb. 6, 2001

(87) PCT Pub. No.: WO00/08400

PCT Pub. Date: Feb. 17, 2000

(30) Foreign Application Priority Data

Aug. 6, 1998 (FR) .............................. 98 10146

(51) Int. Cl.[7] .............................. F25J 5/00; F02G 3/00
(52) U.S. Cl. .............................. 62/648; 60/39.3; 62/643
(58) Field of Search .................. 62/643, 648; 60/39.3

(56) References Cited

U.S. PATENT DOCUMENTS

| | | | | | |
|---|---|---|---|---|---|
| 3,241,327 | A | * | 3/1966 | LaFleur ..................... | 62/643 |
| 3,394,555 | A | * | 7/1968 | LaFleur ..................... | 62/643 |
| 3,950,957 | A | * | 4/1976 | Zakon ...................... | 62/643 |
| 4,054,433 | A | * | 10/1977 | Buffiere et al. ............ | 62/648 |
| 5,329,776 | A | | 7/1994 | Grenier | |
| 5,505,052 | A | * | 4/1996 | Ekins et al. ............... | 62/643 |
| 5,934,104 | A | * | 8/1999 | Fidkowski et al. .......... | 62/643 |
| 6,050,105 | A | * | 4/2000 | Keenan ..................... | 62/643 |
| 6,062,043 | A | * | 5/2000 | Magnet et al. ............. | 62/643 |
| 6,122,932 | A | * | 9/2000 | Guillard ................... | 62/643 |
| 6,134,916 | A | * | 10/2000 | Jahnke ..................... | 62/648 |
| 6,276,171 | B1 | * | 8/2001 | Brugerolle ................. | 62/646 |

FOREIGN PATENT DOCUMENTS

| | | |
|---|---|---|
| DE | 29 30 523 | 2/1981 |
| EP | 0 824 951 A1 | 2/1998 |
| FR | 2 712 383 | 5/1995 |

* cited by examiner

Primary Examiner—William C. Doerrler
(74) Attorney, Agent, or Firm—Young & Thompson

(57) ABSTRACT

In a combined plant consisting of a fluid production apparatus (P) having a main air compressor (44) and a fluid-consuming unit (2), a gas derived from the unit is expanded in a turbine (10, 20, 30, 40, 150) or another device capable of generating mechanical energy which drives a compressor (14, 24, 34, 44, 154° [sic]. Another turbine or device may expand another gas or the same gas derived from the unit so as to drive another compressor.

32 Claims, 1 Drawing Sheet

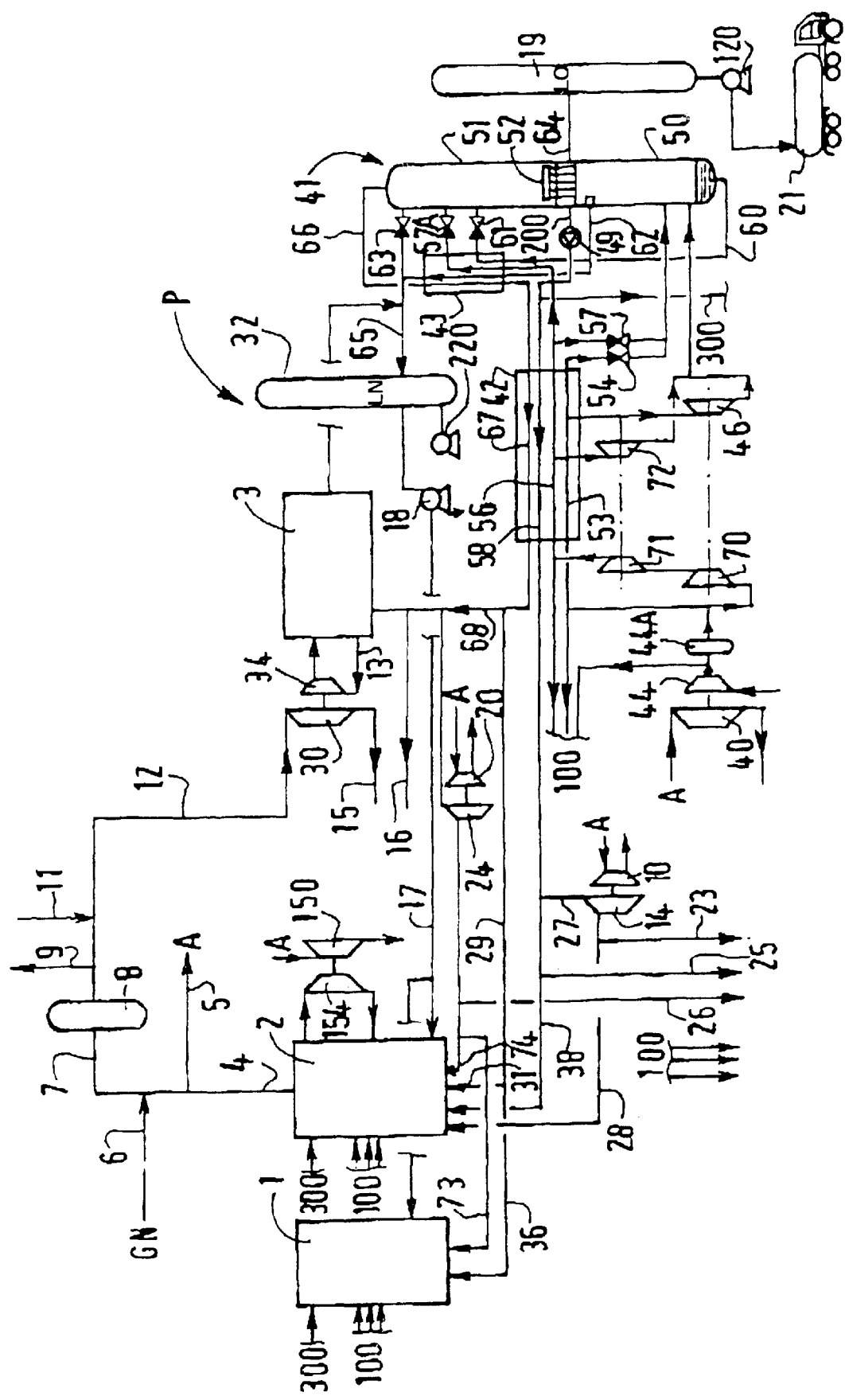

INSTALLATION PRODUCING LOW VOLTAGE ELECTRICITY INTEGRATED IN A UNIT SEPARATING GAS FROM AIR

BACKGROUND OF THE INVENTION

The present invention relates to combined plants consisting of a fluid production apparatus and a unit which consumes a fluid, in which at least one reaction occurs, and to the processes for operating such combined plants.

It is known from EP-A-0 758 733 to expand a product of a chemical reaction and to use the expansion energy to supercharge a stream of air intended for an air separation apparatus or a stream of nitrogen coming from the apparatus.

DE-A-3114842 describes a case in which the air intended for an air separation apparatus is compressed using the energy generated by a Rankine cycle.

U.S. Pat. No. 3,304,074 describes the expansion of the gas from the throat of a blast furnace in a turbine coupled to the main compressor of an air separation apparatus. The process makes no provision for the production of liquid.

French Patent Application FR 98/00724 in the name of the Applicant discloses a process in which an air supercharger is driven by a turbine in which a fluid available on the site (steam, waste gas from a furnace) is expanded.

EP-A-0 282 321 describes the generation of electricity by the expansion of a combustion product, some of the electricity feeding an air separation apparatus or a liquefier.

"Engineering, Construction and Start-up of the ELCO-GAS IGCC power plant at Puertollano" by Gasc et al., POWER-GEN EUROPE, June 1997 and many other articles disclose an integrated plant, comprising an air separation apparatus, a coal gasification unit and a gas turbine in which a gas from the unit is sent to a combustion unit and a gas-produced by the combustion is expanded in a gas turbine coupled to the common compressor of the air separation apparatus and the gas turbine. This system is used to generate energy which is exported, away from the integrated plant.

U.S. Pat. No. 3,950,957 describes an air separation apparatus integrated with a steam production apparatus. The steam turbine drives the air compressor, but this coupling is insufficient to meet all the energy requirements of the air separation apparatus. There is therefore no production of liquid directly from the separation unit.

DE-A-2930523 describes an air separation apparatus integrated with a steam production apparatus. One of the steam turbines drives the air compressor and the other a nitrogen compressor of the air separation apparatus. There is no production of liquid from the air separation apparatus and the compressed nitrogen is not sent to the steam production apparatus.

Certain reactions, such as the combustion of waste, make it possible to produce energy in an amount sometimes limited by expansion of waste gases or by expansion of steam heated by a boiler, where the waste gases burn, or by use in a gas motor.

In order to optimize the production of energy or to minimize the volume of waste gases for environmental purposes, oxygen is used in a large amount, and very often nitrogen for inerting requirements.

The energy consumed for separating the fluids from air and possibly compressing the gases output by the separation apparatus corresponding to the requirements of this process may be much less than the energy produced by the reaction or reactions and in balance this integrated plant may be an energy generator. Typically, 240 t/d of waste with 120 t/d of oxygen gives about 20 to 25 t/h of steam, which develops at most about 5 MW, some of this power being consumed by the air separation, provided that the excess steam available is not used for other purposes, for example for district heating in the periphery of this unit.

SUMMARY OF THE INVENTION

The object of the invention is to reduce the investment cost of an integrated plant while completely or partially eliminating the cost of connecting up the medium-voltage or high-voltage (MV or HV) motors and generators to the electric grid.

Another object of the invention is to improve the overall energy efficiency of the plant by eliminating the transformers, the MV or HV motors and the MV or HV generators of the prior art.

Another object of the invention is to allow more intelligent use of the energy produced by the plant when the electricity generated cannot be distributed or cannot be distributed under favourable economic conditions.

One subject of the invention is a combined plant comprising: at least one unit for consuming a fluid from the air, in which at least one reaction occurs, at least one apparatus for producing fluid from the air comprising an air separation apparatus having a main air compressor; means for sending at least one fluid from the air from the production apparatus to the unit and at least one first device with which at least one portion of a gas derived from the unit in which the reaction occurs is used to produce mechanical energy, the or one of the device(s) possibly driving the main air compressor, characterized in that
  i) a/the device drives at least the main air compressor and/or at least one compressor for compressing a gaseous product output by the air separation apparatus, the production apparatus comprises means for producing a component of air in liquid form, comprising means for withdrawing a liquid from the separation apparatus and at least the driven compressor and the device driving the compressor are connected, electrically, only to means of generating low-voltage electricity and/or means of consuming low-voltage electricity and are connected to means of generating and consuming medium-voltage and high-voltage electricity only through means of generating low-voltage electricity and/or means of consuming low-voltage electricity, and/or
  ii) a/the device drives at least one cycle compressor of means of liquefaction of a gas coming from the air separation apparatus and/or
  iii) a/the device drives at least one compressor for compressing a gas output by or intended for the unit.

Thus, the device is not connected directly to a means of generating medium-voltage or high-voltage electricity or to a means of consuming medium-voltage or high-voltage electricity.

However, the low-voltage electricity, needed for coolant pumps and other accessories, will come from a source of medium-voltage or high-voltage electricity by means of a transformer.

The low voltage is voltage below 1000 V, the medium voltage is between 1000 V and 15 kV and the high voltage is above 15 kV.

Preferably, the air separation apparatus and/or the unit and/or the liquefaction means are not connected directly to means of generating or consuming medium-voltage or high-voltage electricity, once in operation. They may be permanently connected to a means of generating or consuming low-voltage electricity. During the start-up of the air separation apparatus or of the unit or of the liquefaction means, these could be connected to means of generating and/or consuming medium-voltage or high-voltage electricity.

Since the energy production of the unit for the device(s) may exceed the requirements of the apparatus for production of fluid from the air, in order to produce gases intended for the unit and/or for the unit itself this energy may be utilized by producing additional liquid directly from the air separation apparatus or from the liquefaction means.

The gaseous product output by the separation apparatus may be air or a gas enriched with nitrogen, with oxygen or with argon.

The device may drive, at the same time as the main air compressor, an air supercharger possibly integrated with this compressor (i.e. on the same shaft as the compressor).

In a second device, a portion of a gas derived from the unit is used to produce mechanical energy for driving at least one second compressor.

The second compressor may compress air intended for an air separation apparatus or a gas coming from an air separation apparatus or a cycle gas for the liquefaction of a gas coming from the separation apparatus.

In the case of ii) and iii), the production apparatus may comprise means for producing a liquid product, these means possibly consisting of means of liquefaction of a gas coming from the separation apparatus or means for withdrawing liquid from the separation apparatus; the device driving the compressor and the driven compressor are therefore not connected directly to a means of generating medium-voltage or high-voltage electricity and are not connected directly to a means of consuming medium-voltage or high-voltage electricity. On the other hand, they are connected to medium-voltage and/or high-voltage means of generation and of consumption through the low-voltage means of generation and/or of consumption.

The first or second device is a turbine, a gas turbine or a gas motor.

The plant may comprise at least:
a) means for sending compressed air from a compressor of the separation apparatus to the unit and/or
b) means for sending a stream of gaseous oxygen from the separation apparatus to the unit and/or
c) means for sending liquid oxygen from the separation apparatus to the unit and/or
d) means for sending liquid nitrogen from the liquefaction means or from the separation apparatus to the unit and/or
e) means for sending gaseous nitrogen from the separation apparatus to the unit and/or
f) means for sending gaseous or liquid argon from the separation apparatus to the unit.

All the energy not consumed by the unit or by other apparatuses associated with the unit (such as the air separation apparatus) and generated by the device(s), may serve for driving one or more compressors of the air distillation apparatus.

All the energy for compressing the gases from the air distillation apparatus (feed air or gaseous or cycle products) may be delivered by the device(s) of the plant.

The main compressor may be a dedicated compressor feeding only the air separation apparatus or may feed at least one apparatus other than the air separation apparatus.

Optionally, the air separation apparatus produces at least one gas or at least one liquid not intended for the unit and/or for the liquefaction means.

The fluid from the air may or may not participate in the reaction which is carried out in the unit.

The liquefaction means are means for liquefying a gas coming from the air separation apparatus. They comprise a liquefaction cycle with at least one refrigeration turbine which expands the pressurized gas to be liquefied or another source of refrigeration, such as a stream of LNG to be vaporized.

Another aspect of the invention provides an integrated process for production of fluid from the air and of at least one reaction, in which process a fluid from the air, generated by an apparatus for production of fluid from the air comprising an air separation apparatus having a main air compressor, is sent to a unit, which consumes a fluid from the air, in which a reaction is carried out, at least one gas derived from the reaction produces mechanical energy by means of a device and the device drives at least one compressor, possibly the main air compressor of the air separation apparatus, characterized in that, i) a/the device drives at least the main air compressor of the air separation apparatus and/or at least one compressor for compressing a gaseous product output by the air separation apparatus, the apparatus for production of fluid from the air produces at least one component of air in liquid form by withdrawing a liquid from the air separation apparatus and at least the device and the compressor consume and/or generate only low-voltage electricity, this low-voltage electricity coming from or being intended for a source of medium-voltage or high-voltage electricity and/or ii) a/the device drives at least a cycle compressor for liquefying a gas coming from the air separation apparatus and/or iii) a/the device drives at least a gas compressor output by or intended for the unit.

The gaseous product output by the separation apparatus may be nitrogen or a gas enriched with nitrogen, with oxygen or with argon.

Preferably
a) compressed air is sent from a compressor of the separation apparatus to the unit and/or
b) a stream of possibly compressed gaseous oxygen is sent from the separation apparatus to the unit and/or
c) a stream of possibly pressurized liquid oxygen is sent from the separation apparatus to the unit and/or
d) possibly pressurized liquid nitrogen is sent from the liquefaction means and/or from the separation apparatus to the unit and/or
e) possibly compressed gaseous nitrogen is sent from the separation apparatus to the unit and/or
f) possibly pressurized gaseous or liquid argon is sent from the separation apparatus to the unit.

The apparatus for production of gas from the air comprises an air separation apparatus and optionally means of liquefaction of a gas coming from the separation apparatus.

The separation apparatus may consist of a main air compressor, a heat exchanger, at least one turbine for expanding fluid from the air and at least one double air distillation column.

A second device which produces mechanical energy may drive a second compressor.

The second compressor may compress air intended for an air separation apparatus or a gas coming from an air separation apparatus or a cycle gas for liquefaction of a gas coming from the separation apparatus or a gas output by or intended for the unit.

The main compressor may be a dedicated compressor feeding only the air separation apparatus or may feed at least one apparatus other than the air separation apparatus.

Optionally, the air separation apparatus produces at least one gas not intended for the unit and for the means of liquefaction of a gas.

It will be understood that a device which produces mechanical energy may drive one or more compressors of the plant.

The unit and/or the separation apparatus and/or the liquefaction means may consume and/or generate only low-voltage electricity. This low-voltage electricity will come from or be sent to a source of medium-voltage or high-voltage electricity.

In this way, an apparatus for production of fluid from the air may operate without a direct supply of medium-voltage or high-voltage electrical energy from the outside; this allows the costs to be appreciably reduced. The same may apply to the unit which consumes a fluid from the air or the liquefaction means. Of course, there will be an indirect supply of medium-voltage or high-voltage electrical energy to the transformers delivering the low-voltage electricity to the apparatus or to certain elements of the apparatus.

A fluid from the air is either gaseous or liquid air or is a gas or a liquid derived from air by redistillation or another means of separation.

BRIEF DESCRIPTION OF THE DRAWINGS

FIG. 1 illustrates a plant according to the invention.

DETAILED DESCRIPTION OF THE PREFERRED EMBODIMENTS

An example of how to implement the invention will now be described in greater detail with regard to the figure which illustrates a plant according to the invention with an apparatus P for production of gas and liquid from the air integrated with a waste combustion unit 2 fed with air, gaseous oxygen, gaseous nitrogen, liquid oxygen and liquid nitrogen coming from the cryogenic air separation apparatus 41 and the liquefaction means 3.

A stream of air is compressed in the main compressor 44 of the apparatus for separation of gases from the air, this compressor being driven by a turbine 40 and being connected neither to a means of generating medium-voltage or high-voltage electricity nor to a means of consuming medium-voltage or high-voltage electricity in its normal operating phase (possibly excluding start-up). However, it is connected to means of generating low-voltage electricity which are themselves connected to the medium-voltage and/or high-voltage means of generation.

The air distillation apparatus 41 shown in FIG. 1 essentially comprises: an air compressor 44, an apparatus 44A for purifying the compressed air of water and of $CO_2$ by adsorption, this apparatus comprising two adsorption bottles, one of which operates in adsorption while the other is undergoing regeneration: two turbine/supercharger assemblies comprising a first expansion turbine 46 and a first supercharger 70 and a second expansion turbine 72 and a supercharger 71, the shafts of which are coupled; a heat exchanger 42 constituting the heat exchange line of the plant and a double distillation column comprising a medium-pressure column 50 surmounted by a low-pressure column 51, with a reboiler/condenser 52 which brings the overhead vapour (nitrogen) in the column 50 into a heat-exchange relationship with the bottom liquid (oxygen) in the column 51.

This plant is intended to deliver, via a line 58, gaseous oxygen at a predetermined high pressure, which may be between a few bar and a few tens of bar (in the present specification, the pressures in question are absolute pressures).

To do this, liquid oxygen withdrawn from the bottom of the column 51 is brought to the high pressure by the pump 49 in the liquid state, then vaporized and warmed at this high pressure in passages 58 of the exchanger 42.

The heat needed for this vaporization and this warming, and for the warming and possibly the vaporization of other fluids withdrawn from the double column, is provided by the air to be distilled, under the following conditions:

The air compressor 44 of the plant directly compresses all of the air to the first high pressure, of about 23 bar, and a first stream of this air is treated, as previously, in the passages 53, the turbine 46 and the expansion valve 54, then sent to the base of the column 50.

On the other hand, the remainder of this air is supercharged in two steps, by two series-connected blowers: a first blower 70 which is directly coupled to the turbine 46 and a second blower 71 directly coupled to a second expansion turbine 72. The air supercharged at 70 passes entirely through the blower 71 then into the passages 56 of the exchange line 42 and a portion of this air is taken from the exchange line at a temperature T2 greater than the temperature T1 in order to be expanded in the turbine 72. The medium-pressure exhaust of the latter is connected to the base of the column 50, as is that of the turbine 46.

The air at the highest pressure not expanded in the turbine 72 continues to be cooled and is liquefied in the passages 56 until reaching the cold end of the exchange line, then is expanded in expansion valves 57 and 57A and distributed between the two columns 50 and 51.

Also recognized in FIG. 1 are the usual lines of double-column plants. The lines 60, 62 for injection into the column 51 at increasing levels of expanded "rich liquid" (oxygen-enriched air) and of expanded "lean liquid" (practically pure nitrogen), respectively, these fluids being withdrawn from the base and from the top of the column 50, respectively, and the lines 66 for evacuation of the waste gas (impure nitrogen) coming from the level at which the lean liquid is injected. The low-pressure nitrogen is warmed in passages 67 of the exchanger 42. A subcooler 43 serves to cool the streams of rich and lean liquid 60, 62 which is [sic] sent to the low-pressure column through the expansion valves 61, 63 and air to be expanded in the expansion valve 57A.

Liquid oxygen is stored in the storage tank 19, then pressurized by the pump 120 and sent to the tanker-lorry 21.

Liquid nitrogen is stored in the storage tank 32, then pressurized by the pump 220 and sent to the tanker-lorry.

Low-pressure nitrogen is sent to the liquefier 3 where it is liquefied by means of a refrigeration cycle using a compressor 34 to form liquid nitrogen.

The double column may obviously be combined with inter alia an Etienne column, a mixing column or an argon column or it may be replaced with a single column.

Two streams of gaseous nitrogen 36, 73 are sent to the waste storage tank 1 and two other streams of gaseous nitrogen 31, 74 are sent to the waste treatment unit 2.

These streams 73, 74 have been compressed by the compressor 24 from the pressure of the column 51 to a higher pressure. This compressor is connected directly neither to a means of generating medium-voltage or high-voltage electricity nor to a means of consuming medium-voltage or high-voltage electricity. It is driven by the synthesis gas turbine 20 and connected to means of generating low-voltage electricity, which, themselves, may be connected to medium-voltage or high-voltage means of generation and/or of consumption.

A stream of liquid nitrogen 17 coming indirectly from the separation apparatus 41 and from the liquefiers 3 is, after being pressurized at 18, sent from the storage tank 32 to the storage tank 1 and to the unit 2.

A stream of gaseous oxygen 58 is divided into two; one portion 38 is sent directly to the unit 2 and the remainder 27 is compressed by the compressor 14 and a portion 28 of this compressed stream is sent to the unit 2. A stream of liquid oxygen 300 is sent to the unit 2.

A stream of liquid oxygen 300 and two streams of air 100 at different pressures coming from the compressor 44, from the superchargers 70, 71 and from the line 56 are sent to the storage tank 1 and to the unit 2 for the combustion of the waste.

Other gaseous streams 100 comprising streams of air at different pressures, of oxygen and of nitrogen 23, 25, 26 are produced for other applications.

The unit 2 produces a synthesis gas 4 which feeds, at A, one or more turbines. This unit is connected neither to a means of generating medium-voltage or high-voltage electricity nor to a means of consuming medium-voltage or high-voltage electricity. It may possibly be connected to these means only at the start-up phase. However, it must be connected permanently to low-voltage means of generation and/or of consumption which, themselves, are connected to medium-voltage and/or high-voltage means of generation and/or of consumption.

The waste storage tank 1 is fed with low-pressure gaseous nitrogen 29, 36 and/or with gaseous nitrogen 73 compressed by the compressor 24 and/or with compressed air 100 and/or with gaseous oxygen and/or with liquid oxygen 300 and/or with pressurized liquid nitrogen 17 from the storage tank 32 fed by the liquefaction means 3 and the line 62, 65 of the air separation apparatus.

In the example, a portion 5 of the synthesis gas drives the turbines 10, 20, 40. The second turbine 30, which drives the compressor 34 for compressing the cycle gas 13 from the liquefier 3, may also expand a fraction of the synthesis gas 5. All or some of the synthesis gas may be expanded in one or more of the turbines 10, 20, 30, 40, 150. The residual heat of a gas 15 expanded in one of the turbines may preheat the gas to be expanded in the other turbine or another gas to be expanded.

A portion of the synthesis gas is expanded in the turbine 10 which drives the compressor 14 for compressing low-pressure oxygen 27 heated in the passages 58 of the exchanger 42 after pressurization. This compressor is connected directly neither to a means of generating medium-voltage or high-voltage electricity nor to a means of consuming medium-voltage or high-voltage electricity. However, it is connected to means of generating and/or of consuming low-voltage electricity which, themselves, may be connected to medium-voltage or high-voltage means [lacuna] generation and/or of consumption. The compressed oxygen 28 is sent to the unit 2.

Since the energy needed for the separation of the air and for the production of the pressurized gases which is consumed by the unit is much less than that transmitted by the turbine or turbines, the surplus energy is used to produce cryogenic liquids and/or pressurized gases for applications other than the unit 2. The air separation apparatus therefore generates additional liquid 200, 64, 65.

The synthesis gas A drives a turbine or motor 150 coupled to the compressor 154 of a gas output by the unit. This compressor is not connected directly to MV/HV means of generation/consumption. However, it is connected directly to means of generating and/or of consuming low-voltage electricity which, themselves, may be connected to medium-voltage or high-voltage means [lacuna] generation and/or of consumption.

However, if the energy transmitted by the turbines 10, 20, 30 or 150 or one of these turbines is not sufficient, due to the large production of liquid, a medium-voltage and/or high-voltage electricity supply may be provided for several or all of the compressors 14, 24, 34, 154.

Depending on the residual energy, the liquefier 3 may be completely shut down and the liquid oxygen and/or nitrogen may be produced entirely by the air separation unit using one of the processes of U.S. Pat. No. 5,329,776.

The additional liquid produced by the air separation apparatus may be vaporized inside it with a countercurrent of a heat-generating gas in order to deliver gas. In this case, there may be no liquid product which leaves the plant in liquid form.

The gas derived from the unit which drives the turbine or the turbines may be steam 12 generated by a boiler 8 associated with the unit 2. As shown, the synthesis gas 4 mixed 7 (or not) with the natural gas 6 may be sent to a boiler 8 in order to generate steam 12 therein. This steam is derived indirectly from the unit 2.

Steam 11 from an external source may be added to the stream coming from the boiler 8. In addition, steam 9 from the boiler may be exported.

In this case, the steam 12 expands in the turbine 30 which drives the cycle compressor 34 of the nitrogen liquefaction means 3. All or some of the steam may be expanded in this way. This compressor is connected directly neither to a means of generating medium-voltage or high-voltage electricity nor to a means of consuming medium-voltage or high-voltage electricity. However, it is connected to means of generating and/or of consuming low-pressure electricity which, themselves, may be connected to medium-voltage or high-voltage means of generation and/or of consumption.

Of course, the synthesis gas may drive the turbine 30 connected to the compressor 34.

The steam may also drive one of the turbines 10, 20, 40, 150 with or without the turbine 30.

Optionally, steam may serve to preheat the impure nitrogen 66 which regenerates the beds of adsorbents which purify the air or may be used in the adsorption refrigerating units.

In the case of the turbine 40, it may be seen that the main air compressor 44 and the supercharger 70 are driven by the turbines 40, 46, respectively. Of course, the compressor and supercharger may be driven by only one of these turbines. Likewise, two turbines may drive a single compressor 40.

Preferably, the apparatus for production of fluid from the air is an apparatus for the separation of air by cryogenic distillation, comprising a single column or a double column.

If the unit is small, the air separation may be carried out by a means other than by cryogenics (permeation, absorption).

The steam may be sent into a device other than an expansion turbine in order to deliver mechanical energy to the compressor(s).

The steam may deliver mechanical energy to the main air compressor and/or to a compressor for compressing a product from the separation apparatus 41 and/or to the cycle compressor of the liquefaction means.

The plant may include devices for producing mechanical energy which are fed with steam and/or synthesis gas.

The plant may include a production apparatus consisting of an air separation apparatus which does not feed the unit and a liquefier which does feed the unit with liquid.

In its simplest form, the plant may comprise only the unit 2, the separation apparatus 41 (comprising, for example, a main air compressor, a single Claude turbine which expands partially cooled air, a heat exchanger, a double column, a liquid oxygen pump for the oxygen coming from the low-pressure column, means for vaporizing the liquid oxygen in the exchanger, means for sending condensed air to the double column and other lines), the means for sending a gas from the separation apparatus to the unit and a turbine for expanding a synthesis gas or steam from the unit which drives the main air compressor.

The separation apparatus may include several turbines (for fluid from the air).

The separation apparatus may include storage tanks; otherwise, all the liquid produced may be vaporized in the exchanger.

The main air compressor 44 may not have MV or HV connections. It is connected to a source of low-voltage electricity and/or to a consumer of low-voltage electricity, which source (or consumer) may be connected to medium-voltage or high-voltage means of generation and/or of consumption.

In another variant of this simplest form, the main air compressor is driven by the steam derived from the unit.

The unit may, for example, be a unit for production of ethylene oxide, vinyl chloride, titanium oxide, nitric acid or sulphuric acid, methanol or ammonia, or any other chemical or metallurgical unit producing excess energy.

It is clear that the invention could be applied to apparatuses for separating gas mixtures other than air separation apparatuses, such as cryogenic distillation apparatuses for separating mixtures containing at least 1% hydrogen, nitrogen, carbon monoxide and/or methane.

In th s gas [sic], a fluid from the separation apparatus is sent to the unit and a device driven by a gas derived from the unit drives a compressor. This compressor may be the main compressor of the apparatus, a compressor for a product from the apparatus or a compressor of the unit.

Depending on the case, only certain elements of the plant may be connected to the means of generating or of consuming medium-voltage or high-voltage electricity only through the low-voltage means of generation or consumption, whereas other elements may be connected directly to the means of generating or of consuming medium-voltage or high-voltage electricity.

What is claimed is:

1. A combined plant comprising:
   a unit for consuming a fluid from the air, a reaction occurring in said unit;
   an apparatus for producing said fluid from the air, comprising an air separation apparatus having a main air compressor;
   means for sending said fluid from the air separation apparatus to the unit; and
   a first device for producing mechanical energy from a portion of a gas derived from the unit,
   wherein said first device drives one of the main air compressor and a first compressor for compressing a gaseous product output by the air separation apparatus, said air separation apparatus comprises means for producing a component of said fluid as a liquid, said means for producing comprising means for withdrawing said liquid from the air separation apparatus, said liquid being removed as a final product and remaining in liquid form as the final product, and
   wherein said main air compressor and said first device are electrically connected only to one of means of generating low-voltage electricity and means of consuming low-voltage electricity, and are connected to means of generating and consuming one of medium-voltage and high-voltage electricity only through said one of means for generating low-voltage electricity and means of consuming low-voltage electricity.

2. The plant according to claim 1 further comprising a second device for driving a cycle compressor connected to a means of liquefaction of a gas output from the separation apparatus.

3. The plant according to claim 1 further comprising a second device for driving a second compressor for compressing a gas that is one of output by and intended for the unit.

4. The plant according to claim 2, further comprising a third device for driving a second compressor for compressing a gas that is one of output by and intended for the unit.

5. The plant according to claim 2, wherein the cycle compressor is connected only to one of means for generating low-voltage electricity and means for consuming low-voltage electricity, and is connected to means for generating and consuming medium-voltage and high-voltage electricity only through said one of means of generating low-voltage electricity and means of consuming low-voltage electricity.

6. The plant according to claim 3, wherein the second compressor is connected only to one of means for generating low-voltage electricity and means for consuming low-voltage electricity and is connected to one of means of generating and consuming medium-voltage and high-voltage electricity only through said one of means of generating low-voltage electricity and means of consuming low-voltage electricity.

7. The plant according to claim 1 wherein the first device is one of a turbine, a gas turbine, and a gas motor.

8. The plant according to claim 2, wherein the second device is one of a turbine, a gas turbine and a gas motor.

9. The plant according to claim 8, wherein the gas derived from the unit is steam.

10. The plant according to claim 2, wherein at least one of the first and second devices is a gas motor that burns another gas from the unit.

11. The plant according to claim 10 wherein said another gas is one of a synthesis gas and natural gas.

12. The plant according to claim 1 wherein the means for sending a fluid from the air from the production apparatus to the unit comprise:
   a means for sending compressed air from the main compressor to the unit,
   a means for sending a stream of gaseous oxygen from the separation apparatus to the unit,
   a means for sending liquid oxygen from a separation apparatus to the unit,
   a means for sending liquid nitrogen from one of the liquid means for liquifaction and the separation to the unit,
   a means for sending gaseous nitrogen from the separation apparatus to the unit, and
   a means for sending one of gaseous and liquid argon from the separation apparatus to the unit.

13. The plant according to claim 1, wherein the main compressor is a dedicated compressor feeding only the air separation apparatus.

14. The plant according to claim 1, wherein the main compressor feeds at least one apparatus other than the air separation apparatus.

15. An integrated process for producing a gas from the air in one of gaseous and liquid form, comprising the steps of:
generating a fluid from the air using an apparatus for production of the fluid from the air comprising an air separation apparatus having a main air compressor;
sending the fluid to a fluid consumption unit to cause a reaction, the reaction producing at least one gas;
converting the at least one gas into mechanical energy using a first device;
driving the main compressor using the first device,
wherein the air separation apparatus produces a liquid component of air,
said liquid component is withdrawn from the air separation apparatus as a final product and
at least the first device and the main compressor do one of consume and generate only low-voltage electricity.

16. The process according to claim 15 further comprising the step of driving a cycle compressor using a second device connected to a means for liquefying a first gas, said first gas coming from the air separation apparatus.

17. The process according to claim 16 further comprising the step of driving a second gas compressor using a third device, the second gas compressor compressing a second gas that is one of output by and intended for the fluid consumption unit.

18. The process according to claim 16 wherein the second device is a turbine.

19. The process according to claim 18 wherein the at least one gas in the turbine is expanded, the gas being steam.

20. The process according to claim 15 further comprising the step of sending compressed air from the main compressor to the unit.

21. The process according to claim 15 further comprising the step of sending a stream of compressed gaseous oxygen from the separation apparatus to the fluid consumption unit.

22. The process according to claim 15 further comprising the step of sending a stream of pressurized liquid oxygen from the separation apparatus to the fluid consumption unit.

23. The process according to claim 15 further comprising the step of sending pressurized liquid nitrogen from one of the liquefaction means and a separation apparatus to the fluid consumption unit.

24. The process according to claim 15 further comprising the step of sending compressed gaseous nitrogen from the separation apparatus to the fluid consumption unit.

25. The process according to claim 15 further comprising the step of sending one of compressed and pressurized gaseous argon from separation apparatus to the fluid consumption unit.

26. The process according to claim 15 wherein the main compressor feeds at least one apparatus other than the air separation apparatus.

27. The process according to claim 15, wherein at least the first device and the main compressor do one of consume and generate only low-voltage electricity, the low-voltage electricity coming from or being intended for a source of medium-voltage or high-voltage electricity.

28. The process according to claim 16, wherein one of the fluid consumption unit, the separation apparatus and the liquefaction means do one of consume and generate, directly, medium-voltage or high-voltage electricity exclusively during the start-up phase of one of the unit, the apparatus and the liquefaction means.

29. The process according to claim 15, wherein at least one of the first device and the main compressor do one of consume and generate, directly, medium-voltage or high-voltage electricity exclusively during the start-up phase of the said device and main compressor.

30. The process according to claim 17, wherein at least one of the main compressor, the cycle compressor and the second gas compressor do one of consume and generate, directly, medium-voltage electricity continuously.

31. An integrated process for production of gas or of liquid according to claim 15, wherein the apparatus for production of fluid from the air, is replaced with an apparatus for production of hydrogen, nitrogen, carbon monoxide or methane from a mixture comprising at least 1% of at least two of these components, having a main compressor for compressing the mixture, and at least one of a gas and liquid produced from the hydrogen, nitrogen, carbon monoxide or methane production apparatus is sent to the fluid consumption unit.

32. A combined plant comprising:
a unit for consuming a fluid from the air, a reaction occurring in said unit, said reaction outputting a first gas as a byproduct of the reaction;
an apparatus for producing said fluid from the air comprising an air separation apparatus having a main air compressor;
a plurality of delivery lines for connecting said air separation apparatus and said unit, said plurality of delivery lines delivering said fluid to the unit; and
a first device for producing mechanical energy from a portion of said first gas to drive the main air compressor,
wherein said air separation apparatus comprises means for producing a liquid component of air and means for withdrawing said liquid component as a final product.

* * * * *